United States Patent [19]

Cornell et al.

[11] 4,171,183

[45] Oct. 16, 1979

[54] MULTI-BLADED, HIGH SPEED PROP-FAN

[75] Inventors: Robert W. Cornell, West Hartford; Carl Rohrbach, Manchester, both of Conn.

[73] Assignee: United Technologies Corporation, Hartford, Conn.

[21] Appl. No.: 726,338

[22] Filed: Sep. 24, 1976

[51] Int. Cl.² .................. B64C 11/06; B64C 11/14
[52] U.S. Cl. .................. 416/94; 416/223 R; 416/245 R
[58] Field of Search ............ 416/94, 223, 238, 245

[56] References Cited

U.S. PATENT DOCUMENTS

| 1,833,843 | 11/1931 | Leparmentier | 416/223 |
|---|---|---|---|
| 1,878,907 | 9/1932 | Staats | 416/245 X |
| 1,881,080 | 10/1932 | Hubert | 416/175 X |
| 2,401,365 | 6/1946 | Mercier | 416/94 |
| 2,665,055 | 1/1954 | Adams | 416/168 |
| 2,670,050 | 2/1954 | Enos | 416/94 |
| 2,755,044 | 7/1956 | Gurney | 416/94 X |
| 3,226,031 | 12/1965 | Holland | 416/223 X |
| 3,561,883 | 2/1971 | Berry | 416/87 X |
| 3,834,157 | 9/1974 | Hoffmann et al. | 416/94 X |

OTHER PUBLICATIONS

Aviation Week and Space Technology, Jan. 3, 1977, vol. 106, No. 1, pp. 46-50.

Primary Examiner—Everette A. Powell, Jr.
Attorney, Agent, or Firm—Charles A. Warren; Donald F. Bradley

[57] ABSTRACT

A small diameter, highly loaded multiple bladed variable pitch propulsor having swept blades with thin advanced airfoil sections, integrated with a nacelle contoured to retard the airflow through the blades thereby reducing compressibility losses and designed to operate with a turbine engine and using a single stage reduction gear resulting in a high performance, lightweight propulsion system providing a substantial improvement in efficiency over the high bypass ratio turbofan engine.

10 Claims, 5 Drawing Figures

MULTI-BLADED, HIGH SPEED PROP-FAN

BACKGROUND OF THE INVENTION

Propellers for high speed aircraft turn at low rotative speeds in order that the tip velocity will be effectively subsonic to avoid large performance losses due to compressibility effects and, when driven by turboshaft engines, usually require two stages of reduction gears to reduce the shaft speed from the high turboshaft speed to the slow propeller speed. These propellers customarily have three or four blades and, when compared to jet and turbofan engines, must be large in diameter to absorb the engine power. The structural requirement for thick airfoils with their low critical Mach number restrict the maximum aircraft operating speeds below those of turbofan powered aircraft. The need for low tip speeds for relatively high speed flight requires a slow shaft speed which can generally be obtained only with a two stage reduction gear which, because of the low speeds, must be relatively heavy. This heavy two-stage reduction gear severely increases the power plant weight and space requirements together with loss of efficiency in the power train. The large diameter propeller and attendant gear train pose installation problems in high speed aircraft and result in high gross weight of the propulsion system and weight penalties to the airframe.

SUMMARY OF THE INVENTION

A feature of the present invention is a small diameter prop-fan, nearly one-half the usual propeller diameter, with a large number of blades, from 6 to 12, with a contoured nacelle and in many installations with these blades swept to improve their aerodynamic efficiency at high aircraft speeds. This configuration will permit the use of a single gear reduction stage since the propeller may rotate at a higher rpm and will result in a significantly lighter weight propulsion system. Another feature is the use of thin airfoil sections for the blades, which are possible because of the smaller prop-fan diameter and the larger number of blades with resultant lower blade loading. These thin sections permit high aircraft flight speeds with good propulsion efficiency. The effective length of these blades is also decreased by an increased diameter of the hub, necessary to support the large number of blades, and this hub is contoured to retard the flow of the air between the blades at and adjacent the hub for better aerodynamic efficiency.

This is, in effect, an integration of the several factors of blade length, nacelle diameter and shape, number of blades, thin airfoil sections for the blades, and a sweep at the outer parts of the blades to produce a uniquely successful propulsor of high aerodynamic and structural efficiency and compatibility with high speed aircraft not achievable with conventional propeller systems.

This concept represents a significant improvement over high bypass ratio turbofan engines. A prop-fan of this type will be usable on commercial aircraft that cruise up to at least Mach 0.8. The conventional propeller is limited generally to aircraft cruising below Mach 0.65 and thus not presently usable on advanced high speed (M 0.8) aircraft. This prop-fan is thus usable in place of high bypass turbofan engines. The swept blades and the contoured nacelle shape permit a higher rotational speed and higher flight speed, without the airfoils exceeding their critical Mach number. The prop-fan operates without the shroud of the bypass fan engine with its attendant drag. Significant fuel savings in engine operation over the bypass engine, such as 20%, permit lower fuel load in the aircraft and thus greater payloads.

According to the invention, this prop-fan, with a large number of relatively short blades, which are swept at the outer portion of the blade and operate in the presence of a contoured nacelle to reduce the effective aerodynamic Mach number, and in which the blades have thin airfoil sections made structurally possible by the reduced blade length, is a high performance, high speed, propulsor. This particular combination of these elements, properly integrated, also permits a single stage of reduction gear, when used with a turboprop engine, with a resultant significant reduction in the weight of the propulsion system. This prop-fan with variable pitch blading operates at high efficiency in modern aircraft that cruise up to at least M 0.8 and has the compactness of propulsion system required for such aircraft together with important improvements in weights and dynamic behavior.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

Figure 1:
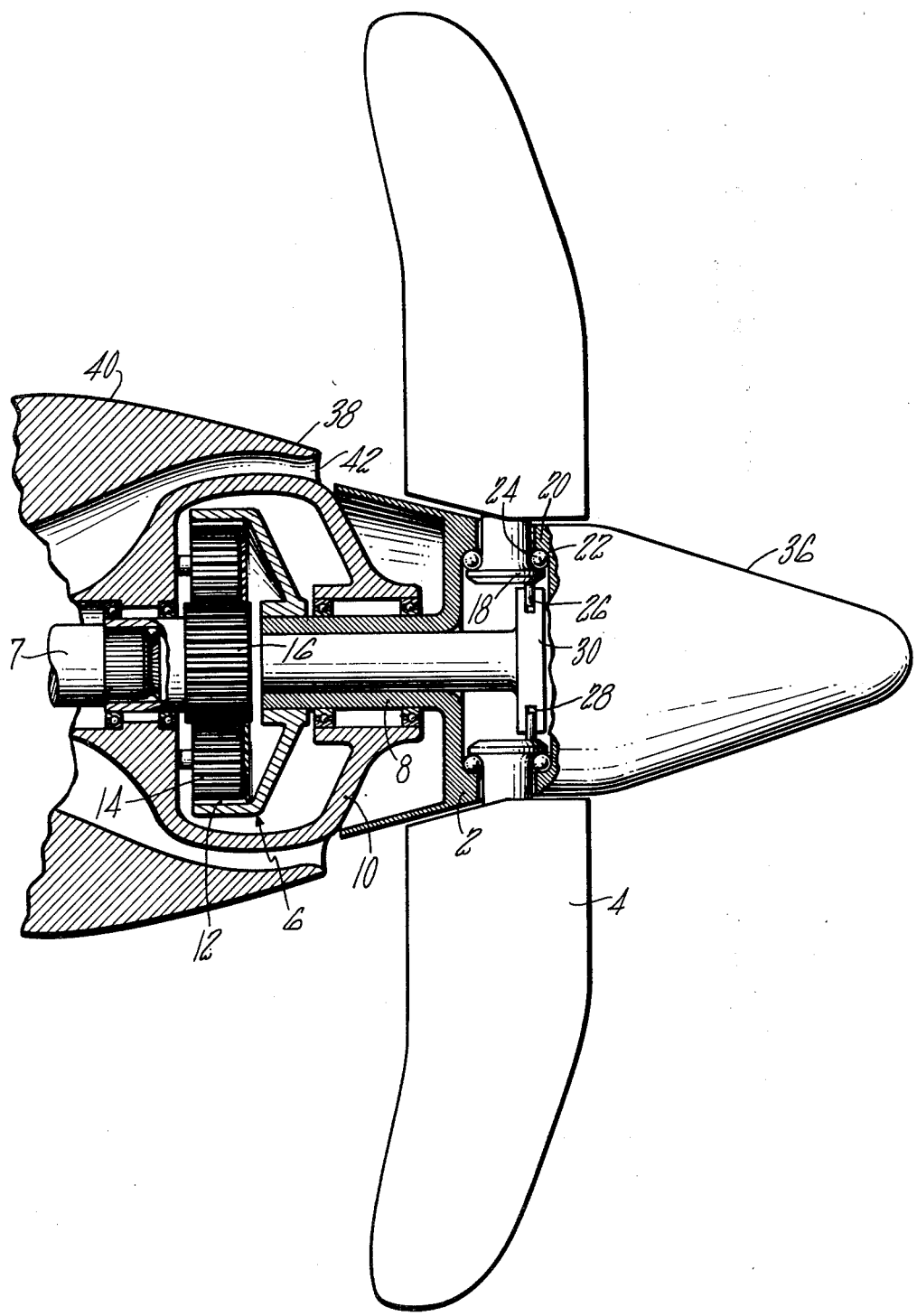
FIG. 1 is a side elevation of a prop-fan embodying the invention with parts broken away.
Figure 2:
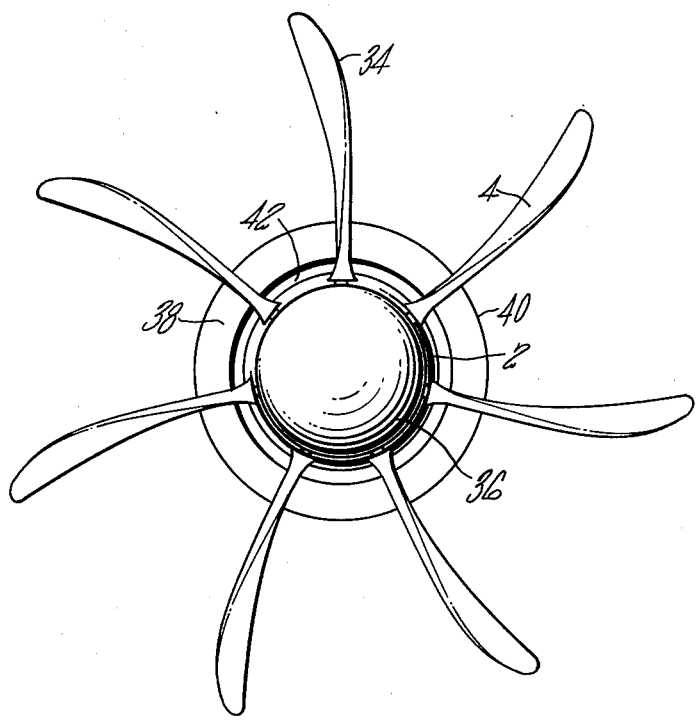
FIG. 2 is a front elevation of the prop-fan.

The prop-fan of the invention is a multi-bladed propeller having a hub 2 that supports the several blades 4 for rotation with the hub about its axis. The hub is driven through a reduction gear 6 from the power shaft 7 of a turboshaft engine. The prop-fan shown has eight blades but, depending on the engine power and installation requirements, from 6 to 12 blades may be utilized.

The reduction gear shown is a planetary gear type in which the hub shaft 8, journaled in a gear box housing 10 has a ring gear 12 meshing with several planet gears 14 carried by the gear box housing and positioned between the ring gear 12 and a sun gear 16 splined to the power shaft 7. The particular type of reduction gear is not critical; any gear reduction that will provide the necessary speed for propeller operation may be utilized. However, because of the high rotational speed permitted by the small diameter prop-fan, only a small single-stage lightweight gear reduction system is required in contrast to the heavy large two-stage systems necessitated by conventional turboprops.

The blades 4 are shown as having inner retentions or bases 18 with bearing races by which the blades are mounted in a carrier 20 in the hub so that each blade may be rotated about its radial axis for pitch changing.

As shown, the carrier has a bearing race 22 for each blade and the retention 18 of the blade is mounted to turn on the race as by a row of ball bearings 24.

A suitable pitch changing mechanism is utilized for pitch adjustment of all of the blades in unison. Any well-known pitch change mechanism may be used. By way of example, the mechanism shown includes an eccentric pin 26 on each blade base fitting in a peripheral groove 28 in a mechanical actuator 30 movable axially of the hub by any suitable means not shown. Such means are well known in the art, either mechanical, electrical, or hydraulic.

The variable pitch of the blades permits the omission of thrust reversers as in many turbofan engines, since the reverse pitch capability permits a more effective reversal of thrust. The pitch change feature also allows matching the propulsion system to both takeoff and cruise; the turbofan engine is tailored only to one condition, usually cruise but sized to give the necessary takeoff thrust. The prop-fan, with its variable pitch, can be sized for high efficiency at all conditions of takeoff, cruise and reverse thrust. The prop-fan may be feathered in the event of trouble in the propulsion system; the turbofan windmills in the event of engine shutdown. The turbofan has an attendant drag from its duct; the prop-fan has no duct and, therefore, avoids the losses resulting therefrom.

The prop-fan diameter is nearly one-half the diameter of the conventional propeller. For example, the prop-fan diameter may be from 10 to 14 feet, compared to 18 to 24 feet for an equivalent conventional propeller. The diameter is thus about 60% of that of a corresponding conventional propeller. This reduction in diameter permits a higher rotational speed at high flight speeds without exceeding the tip speed airfoil critical Mach number limitation and thus makes possible only the single stage of gear reduction as shown.

The prop-fan has more blades than the usual propeller, preferably about, or more than, double the usual number. Thus, a preferred construction as shown will have eight blades in contrast to the usual three or four blades. From 6 to 12 blades are desirable and from 7 to 10 are considered preferable. These blades are variable pitch as above stated.

The smaller diameter of the prop-fan and the larger number of blades are integrated with and make possible the incorporation of other features that combine to give the uniquely successful, highly efficient propulsor. One of these features is that the blades are made with thin airfoil sections, as for example, the well known NACA 16 airfoil section 31 at the tip, FIG. 3, and NACA 65 section 32 at the root. This latter section is somewhat thicker than the tip airfoil to carry the loading on the blade. Another airfoil section which is usable is the family of Whitcomb thin airfoil sections. Since there are many blades and the blades are much shorter than the conventional propeller blade, the airfoils may be made much thinner and lighter in weight because of the significantly lower structural blade loadings, both steady and vibratory. The vibratory loads on these shorter blades, by reason of the shorter moment arm, are much less and permit the use of significantly thinner blades. The thickness to chord ratio in this type of airfoil is as low as from about 2–4%, and the present construction of the shorter blade permits such a thickness ratio for a major portion of the blade from the tip end.

Figure 3:
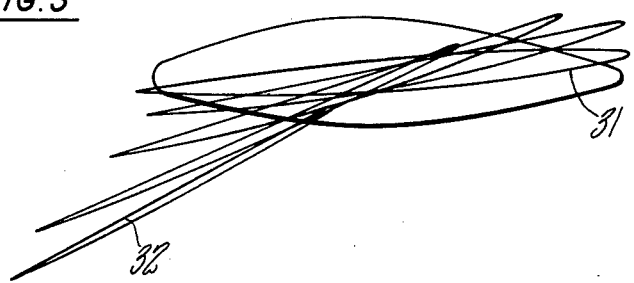
FIG. 3 is a diagram showing the airfoil sections of the blade.

Depending on the aircraft installation requirements, another of these features is the blades are also swept toward the tip, this sweep 34 beginning, for example, at about 40% of the length of the blade from the root and increasing to about a 30° sweep at the tip. The purpose of this is to reduce the effective helical Mach number to a value less than the critical Mach numbers of the airfoil sections along the length of the blade. The sweep of the blades is more advantageous at cruise speeds above 0.7 Mach number. The relative pitch of the airfoil sections decreases toward the tip of the blade to allow for the higher blade rotational speeds at these sections and thus, as shown in FIG. 3, there is a twist in the blade from root section 31 to tip section 32.

As above stated the relative hub diameter is larger than that for the usual propeller hub. This is necessitated by the larger number of blades, requiring a larger hub in which the blades can be mounted. This hub serves another purpose in that it reduces the effective length of the blade to the most aerodynamically efficient portion of the blade and reduces the structural blade bending loads which permits the use of thin airfoil sections.

The spinner 36 covering the hub and the nacelle 38 back of the spinner and merging therewith are shaped to reduce the effective airflow between the blades at and adjacent the spinner so as to maintain an effective stream velocity through the blades, which is equal to or less than the critical Mach number of the inboard airfoil sections. Thus, in the construction shown, the spinner generally increases in diameter from front to back so that at the leading edge of the blades the spinner diameter is about one-fourth the diameter of the propeller. The spinner may be contoured according to the area-ruled principles in the vicinity of the blades as shown in FIG. 1. This spinner blends with the nacelle which increases to a diameter about three-eighths the diameter of the propeller at a point 40 a short distance downstream of the trailing edges of the blades. The slowdown of the airflow near the spinner and nacelle is substantial but with little significant effect at the tip. The major effective reduction in the tip helical Mach number is obtained by the sweep. The annular passage 42 within the nacelle represents the inlet to the turbine engine powering the prop-fan.

Figure 4:
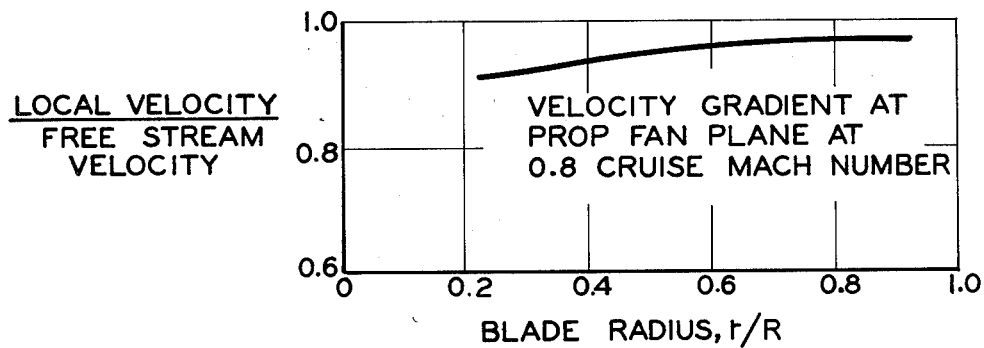
FIG. 4 is a diagram showing the velocity gradient through the prop-fan due to the contoured nacelle.

With reference to FIG. 4, the contouring of the nacelle and spinner is such as to produce a velocity gradient that is about 90% of the free stream Mach number at the portion of the blade adjacent the spinner, thereby keeping the flow about the inboard airfoils below their critical Mach number. The velocity gradient increases slightly toward the blade tip but does not reach the free stream Mach number at the blade tip. The incorporation of sweep over the outboard portion of the blade further reduces the effective helical airstream velocity below the critical Mach number of the outboard airfoil sections.

These blades are designed to operate with effective pressure ratios significantly higher than conventional large, slow speed propellers, for example, about 1.047 at 35,000 feet at 800 feet/sec tip speed and 0.8 Mach number cruise speed. Although this pressure ratio is higher than conventional propeller pressure loadings of about 1.01, it is significantly less than the disc loading of the fans in high bypass engines which are generally on the order of a pressure ratio of 1.6. Under these conditions the prop-fans show an ideal propulsive efficiency of 97% as compared to a 6 to 1 bypass ratio fan ideal propulsive efficiency of about 80%. This is fundamental to the better performance of the prop-fan compared to the turbofan.

Figure 5:
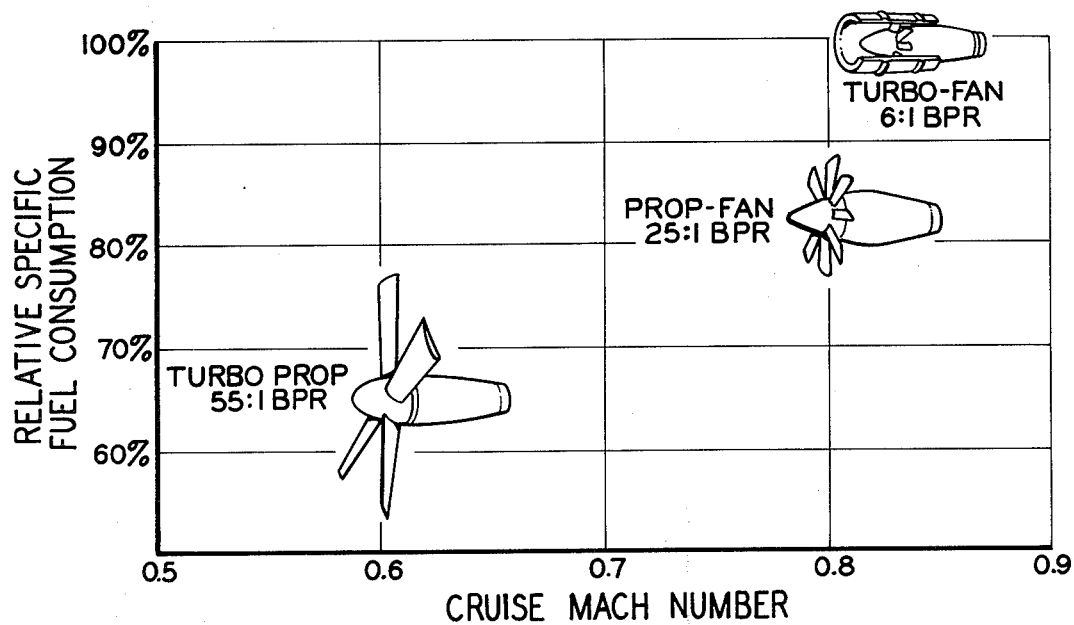
FIG. 5 is a diagram showing the comparison of the fuel consumption of a turboprop, a turbofan and this prop-fan.

As shown in FIG. 5, the prop-fan lies between the turboprop and the turbofan in specific fuel consumption and bypass ratio and can operate at cruise Mach number commensurate with turbofans. Fuel savings for the installed prop-fan are expected to be about 15–25% over a turbofan aircraft when each is sized to the same payload and range and at a 0.8 Mach number cruise speed. This prop-fan would be a low fuel consumption propulsion system for aircraft designed for cruise Mach number of 0.7 and above.

This prop-fan having about 60% the diameter of a conventional turboprop, together with the single stage light-weight reduction gear, has the compactness required for the newer advanced aircraft. The large number of relatively short variable pitch blades combined with the shaped nacelle, the blade sweep on the outer portion of the blade, and the thin airfoil sections result in a propulsion system that is expected to assure significantly less fuel consumption than a high bypass ratio turbofan for a cruise Mach number of about 0.8 and with improved takeoff, climb, and reverse performance and lower airport noise levels, with cabin comfort, reliability and maintenance costs at least equal to such turbofans.

The smaller diameter and the larger number of blades are integrated with very thin airfoil sections for the blade, a contoured nacelle and a swept blade to produce a propulsor having the compactness required for modern high speed (0.8 Mn) transport aircraft along with significant improvement in propulsion system weights and associated dynamic behavior. Benefits of this integrated prop-fan construction include installation compatibility with the aircraft, alleviating ground, wing, and fuselage clearance problems, reduced installed weight compared to turbofan installations, reduced vibration and noise level in the cabin, and improved propulsor/nacelle/airframe dynamics that alleviate system installation instability phenomena at high speed.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. A small diameter multi-blade prop-fan integrated system having:
   from 6 to 12 short blades thereon of a length to make a fan of from about 10 to 14 feet in diameter,
   each blade having a very thin airfoil shape based on the blade length, the major portion of the blade being from about 2–4% thick,
   each blade being swept at the tip,
   said blades having a variable pitch,
   a large diameter hub on which said blades are mounted for pitch changes,
   a large diameter spinner surrounding the hub, and
   a nacelle back of the spinner and forming an extension thereof, said spinner and nacelle being contoured to produce a subsonic flow of air between the blades adjacent the bases thereof.

2. A prop-fan as in claim 1 in which the diameter of the propeller is approximately 60% that of a conventional propeller and the spinner immediately upstream of the blade is about one-quarter the diameter of the prop-fan.

3. A prop-fan as in claim 2 in which the diameter of the nacelle immediately downstream of the blades is about 35% of the diameter of the propeller and the spinner and nacelle are contoured to reduce the effective Mach number of the airflow to less than the critical Mach number of the blade airfoils adjacent thereto.

4. A prop-fan for use with a turbine engine, said propeller having:
   a large number of relatively short blades having inner end retentions and tips,
   a hub in which the blades are mounted,
   a spinner surrounding the hub,
   a nacelle back of the spinner and merging therewith, each of said blades having a very thin airfoil shape and each blade being swept over the outer portion of the blade length, with the sweep increasing toward the blade tip, and
   said nacelle and spinner being so contoured as to reduce the velocity of the air flowing between the blades adjacent the nacelle.

5. A prop-fan as in claim 4 in which the blades have a length such that the effective velocity of the air at the blade tip when the fan is in use is no greater than the critical Mach number of the airfoil sections.

6. A prop-fan for use with a turbine engine in aircraft, said prop-fan having:
   a large number of relatively short blades having inner end retentions and tips,
   a large diameter hub in which the blade retentions are mounted for rotation, substantially on the radial axis of the blade,
   a spinner surrounding the hub,
   a nacelle back of the spinner and merging therewith,
   each of said blades having a very thin airfoil shape in cross section,
   each blade being swept for the outer portion of each blade, this sweep increasing toward the blade tip to as much as a 30° sweep at the tip, and
   means for adjusting the pitch of all the blades in unison in the hub.

7. A prop-fan as in claim 6 in which the nacelle and spinner are contoured to be about one-fourth the diameter of the fan in the region of the blades and about three-eighths of the diameter downstream of the blades.

8. A propulsion system for a turbine engine having a power turbine including a prop-fan comprising:
   a large number of relatively short blades having inner ends and outer tips,
   a large diameter hub engaging the inner ends of the blades and supporting said blades for variable pitch, the hub and blades having a diameter of from 10 to 14 feet,
   each of said blades having a very thin airfoil shape in cross section having a thickness ratio of about 2 to 4% for a major portion of the length from the tip,
   each blade being swept for the outer portion of the blade, and
   said prop-fan being in combination with a single stage gear reduction system driven directly from the power turbine.

9. A propulsion system as in claim 8 in which the prop-fan diameter is about 60% that of a comparable conventional propeller.

10. A propulsion system as in claim 9 in which the prop-fan has a spinner surrounding the hub and a nacelle back of the hub, and the spinner and nacelle are contoured to reduce the velocity of the air flowing over the portion of the blades adjacent thereto to less than the critical Mach number of the blade airfoils in this area.

* * * * *